US009695948B2

(12) United States Patent
Kienreich et al.

(10) Patent No.: US 9,695,948 B2
(45) Date of Patent: Jul. 4, 2017

(54) VACUUM VALVE

(71) Applicant: VAT Holding AG, Haag (CH)

(72) Inventors: Martin Kienreich, Horbranz (AT); Bernhard Duelli, Ubersaxen (AT)

(73) Assignee: VAT Holding AG, Haag (CH)

( * ) Notice: Subject to any disclaimer, the term of this patent is extended or adjusted under 35 U.S.C. 154(b) by 100 days.

(21) Appl. No.: 14/669,141

(22) Filed: Mar. 26, 2015

(65) Prior Publication Data
US 2015/0285396 A1 Oct. 8, 2015

(30) Foreign Application Priority Data

Apr. 2, 2014 (AT) .................................. A240/2014

(51) Int. Cl.
F16K 31/44 (2006.01)
F16K 51/00 (2006.01)
(Continued)

(52) U.S. Cl.
CPC ................ F16K 1/523 (2013.01); F16K 1/02 (2013.01); F16K 15/18 (2013.01); F16K 17/06 (2013.01);
(Continued)

(58) Field of Classification Search
CPC ........ F16K 1/02; F16K 15/023; F16K 15/028; F16K 15/063; F16K 15/18; F16K 17/04;
(Continued)

(56) References Cited

U.S. PATENT DOCUMENTS 372,503 A * 11/1887 Wheeler ................. F16K 15/18
16/DIG. 21
500,645 A * 7/1893 West ..................... F16K 17/168
137/522
(Continued)

FOREIGN PATENT DOCUMENTS

DE 1450586 2/1969
DE 3125034 1/1983
(Continued)

OTHER PUBLICATIONS

"VAT Vacuum Vales 2016", 11 pages, downloaded from internet on Feb. 24, 2014, www.vatvalve.com.
"Genesis Modular Valves", 4 pages, downloaded from internet on Feb. 25, 2014, www.n-c.com.
Drawing dated Apr. 24, 2003 of the Assignee "Zusammenstellungszeichung" together with explanations.

Primary Examiner — Mary McManmon
Assistant Examiner — Hailey K Do
(74) Attorney, Agent, or Firm — Volpe and Koenig, P.C.

(57) ABSTRACT

A vacuum valve with a housing having a valve seat, a closure member which, in a closed position, is pressed against the valve seat, and a manual actuator, by which the closure member is displaceable in a linear manner and which includes a screw transmission, which is actuatable by a rotational element and has a first driving part connected to the rotational element and a second driving part connected to the closure member. The driving parts have mating external and internal threads. A closing spring acts between the valve housing and the closure member. The first driving part is displaceable relative to the valve housing parallel to the closing direction, and with the closure member in the open position, the closure member is held against displacement in the closing direction by a supporting stop against which a stop face of the rotational element or of the first driving part abuts.

8 Claims, 4 Drawing Sheets

(51) Int. Cl.
*F16K 1/52* (2006.01)
*F16K 1/02* (2006.01)
*F16K 17/06* (2006.01)
*F16K 17/19* (2006.01)
*F16K 15/18* (2006.01)
*F16K 31/50* (2006.01)
*F16K 41/10* (2006.01)

(52) U.S. Cl.
CPC ............ *F16K 17/19* (2013.01); *F16K 31/508* (2013.01); *F16K 41/103* (2013.01)

(58) Field of Classification Search
CPC ............... F16K 17/0413; F16K 17/042; F16K 17/0486; F16K 17/06; F16K 17/168; F16K 17/18; F16K 17/19; F16K 17/196; F16K 24/00; F16K 24/04; F16K 31/50; F16K 31/504; F16K 31/508; F16K 39/02; Y10T 137/0491; Y10T 137/6086; Y10T 137/7837; Y10T 137/7876; Y10T 137/7877; Y10T 137/7878; Y10T 137/7897; Y10T 137/7904; Y10T 137/7906; Y10T 137/8158
USPC .............. 251/266, 264, 284; 137/15.24
See application file for complete search history.

(56) References Cited

U.S. PATENT DOCUMENTS

| | | | |
|---|---|---|---|
| 2,634,748 A * | 4/1953 | Morrison ................ | F16K 1/00 137/523 |
| 3,934,814 A | 1/1976 | Orszak | |
| 4,078,722 A | 3/1978 | Luckenbill | |
| 4,907,780 A * | 3/1990 | Phillips .................... | F16K 1/02 251/214 |
| 6,289,932 B1 | 9/2001 | Thackeray et al. | |
| 6,669,170 B2 | 12/2003 | Kersken et al. | |
| 7,011,294 B1 | 3/2006 | Ehrne et al. | |
| 2006/0169940 A1 | 8/2006 | Mayer et al. | |
| 2009/0194728 A1 | 8/2009 | Pickett et al. | |

FOREIGN PATENT DOCUMENTS

| | | | |
|---|---|---|---|
| DE | 3717724 | 12/1988 | |
| DE | 3831249 | 3/1990 | |
| DE | 4023845 | 4/1992 | |
| DE | 102008003725 | 7/2009 | |
| FR | 3003621 A1 * | 9/2014 | ........ F16K 31/508 |
| JP | S60179584 | 9/1985 | |
| JP | H08200539 | 8/1996 | |
| JP | 2005344918 | 12/2005 | |
| WO | 2012162051 | 11/2012 | |

* cited by examiner

Fig. 1
Fig. 2
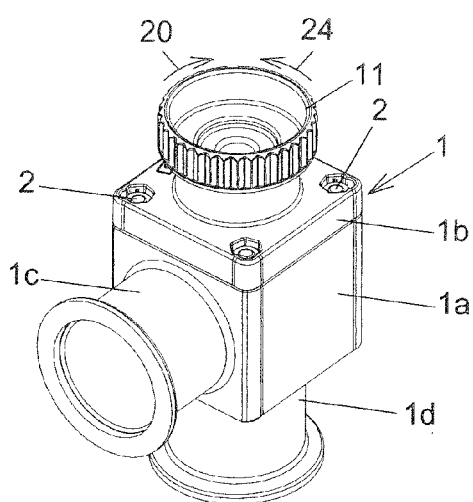
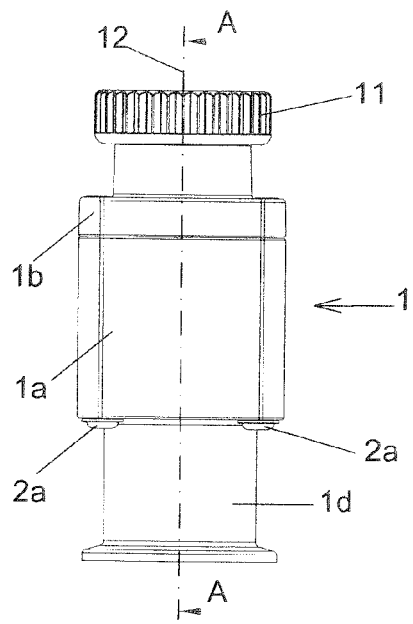
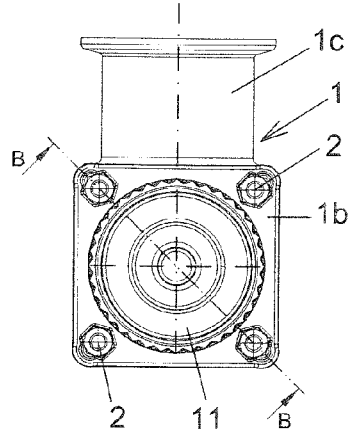
Fig. 3
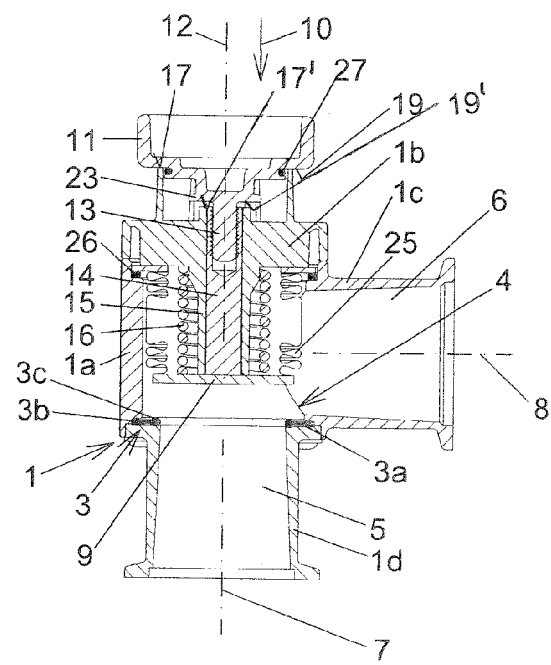
Fig. 4

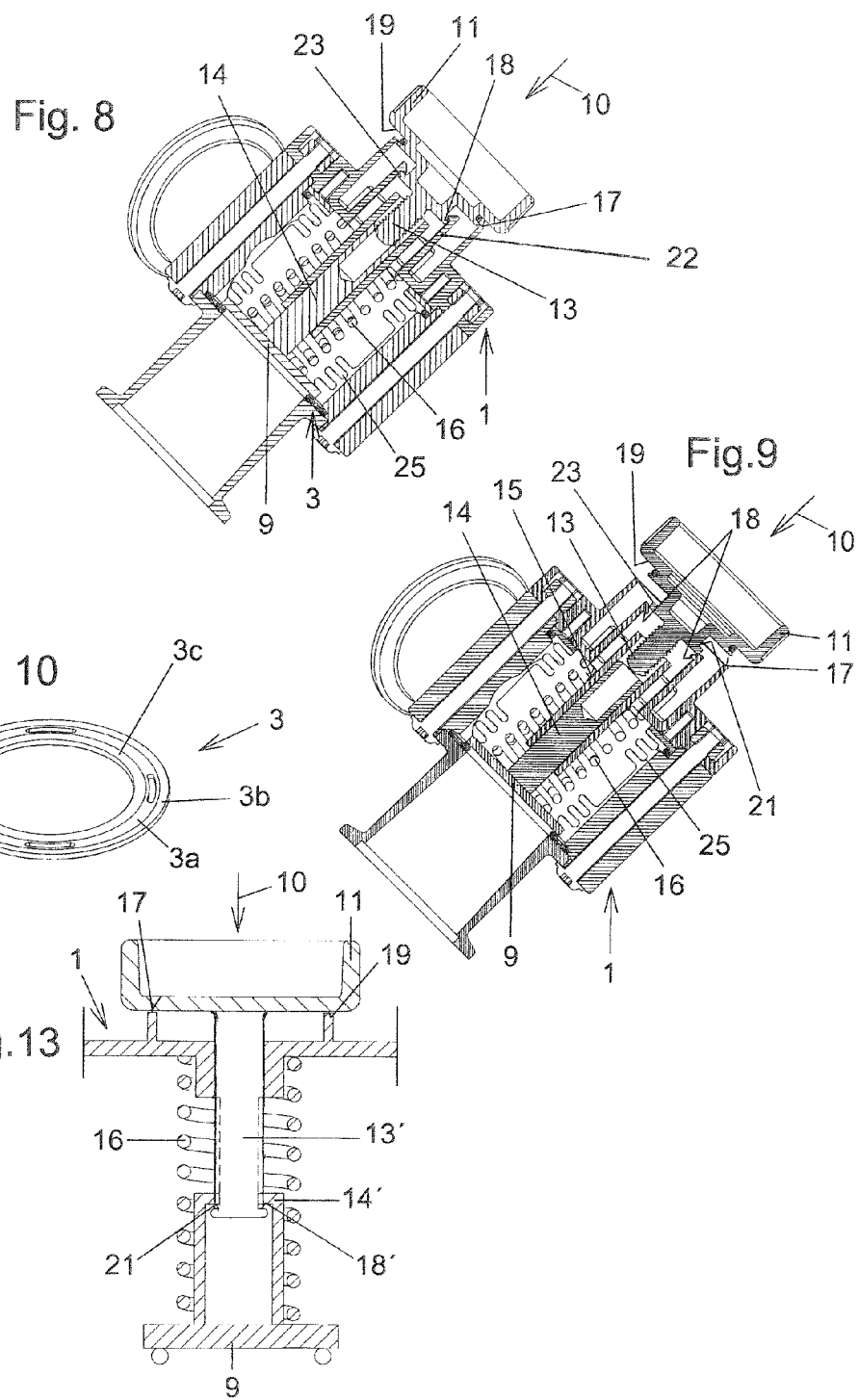

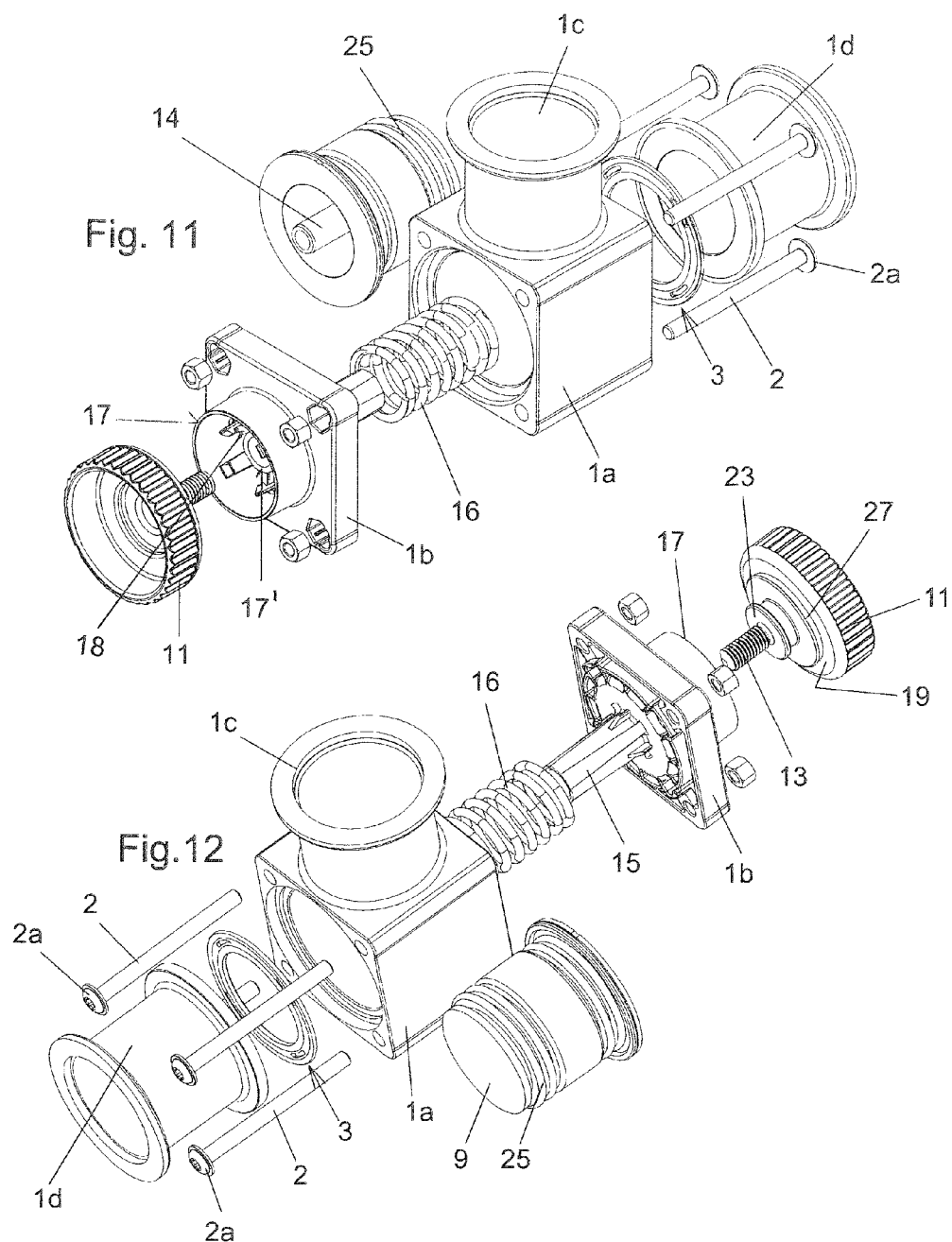

VACUUM VALVE

INCORPORATION BY REFERENCE

The following documents are incorporated herein by reference as if fully set forth: Austrian Patent Application No. A240/2014, filed Apr. 2, 2014.

BACKGROUND

The invention relates to a vacuum valve including a valve housing which comprises a valve seat, a closure member which, in a closed position, is pressed against the valve seat with the vacuum valve in a closed state and in an open position is raised from the valve seat with the vacuum valve in an open state, and a manual actuating means, by means of which the closure member is displaceable in a linear manner in a closing direction from the open position into the closed position and in a direction opposite the closing direction from the closed position into the open position and which comprises a screw transmission, which is actuatable by means of a rotational element and has a first driving part which is connected to the rotational element and a second driving part which is connected to the closure member, wherein the first and second driving parts, one of which comprises an external thread and the other an internal thread, are in threaded engagement and as a result of rotating the rotational element in a closing direction of rotation the closure member, which is situated in the open position, is displaceable in the closing direction and as a result of rotating the rotational element in an opening direction of rotation, which is opposite to the closing direction of rotation, the closure member, which is situated in the closed position, is displaceable in a direction opposite the closing direction and wherein there is present a closing spring, which acts upon the closure member in the closing direction with the closure member in the closed position.

Vacuum valves where the closure member is adjusted in a linear manner between the open position and the closed position by means of a manual actuating means have become known in particular in the form of angle valves. In the case of angle valves, the axes of the valve openings of the valve housing, which communicate with one another when the vacuum valve is open and are sealed in relation to one another when the vacuum valve is closed, are at an angle to one another, in particular a right angle. The valve seat, in this connection, is generally coaxial with respect to one of the valve openings. In another embodiment of such previously known vacuum valves, the first and second valve openings are coaxial to one another and the valve seat is in a plane that is inclined hereto, the linear adjustment of the closure member being effected in a direction which is at an angle to the axes of the valve openings.

Angle valves with manual actuating means proceed, for example, from DE 31 25 034 A1 and DE 10 2008 003 725 A1. A threaded spindle, which is in threaded engagement with a portion of the valve housing which comprises an internal thread and consequently forms a (fixed) spindle nut, is connected to the manually actuatable rotational element, which is realized in the form of a rotational knob or hand wheel. The closure member is connected to the threaded spindle by means of a rod.

In the case of a further previously known, commercially obtainable angle valve with manual actuating means, the threaded spindle which is connected to the rotational element comprises first and second threaded portions. The first threaded portion is screwed into an internal thread of the closure member. The second threaded portion is screwed into an internal thread of a valve rod which is connected to the closure member. The closure member and the valve rod, in this connection, are non-rotatably secured by means of a bellows which extends between the closure member and the valve housing. The two threaded portions comprise threads with different directions of rotation, that is a right-handed and a left-handed thread. Rotating the rotational element results in generating a travel on the one hand between the threaded spindle and the valve housing and on the other hand a travel in the same direction between the threaded spindle and the valve rod. The number of necessary revolutions of the rotational element for opening and closing the vacuum valve is halved as a result.

A vacuum valve of the type mentioned in the introduction proceeds from US 2006/0169940A1. An exemplary embodiment which is realized in the form of an angle valve is shown where the threaded spindle is mounted in the valve housing so as to be rotatable but axially non-displaceable. A non-rotatably secured threaded nut is arranged on the threaded spindle and a spring is arranged between the threaded nut and the closure member. The spindle nut consequently influences the closure member by means of the spring. Once the closure member has been placed on the valve seat, the desired pressing force can consequently be achieved by compressing the spring in a corresponding manner. This valve is in particular a high vacuum valve, the closure member consisting completely of metal at least in portions which adjoin the valve seat.

Apart from manually actuated angle valves, angle valves which are driven by means of pneumatically acting piston/cylinder units are frequently used. These types of vacuum valves proceed, for example, from US 2009/0194728A1, DE 40 23 845 C1 and U.S. Pat. No. 6,289,932B1. In order to ensure that the vacuum valve is closed in the event of the pressure medium failing, closing springs which act between the valve housing and the closure member are used.

Other types of vacuum valves with linearly adjustable closure members proceed, for example, from U.S. Pat. No. 7,011,294, DE 37 17 724 A1 and DE 38 31 249 A1. In the case of the vacuum valve made known from U.S. Pat. No. 7,011,294, the closure member is realized in a wedge-shaped manner. DE 37 17 724 A1 and DE 38 31 249 A1 show vacuum valves with seals and sealing faces, which interact with said seals and comprise other three-dimensional forms.

A vacuum valve which is realized in the form of an angle valve and has manual actuating means proceeds from U.S. Pat. No. 6,669,170B2. The rotational element is provided with a curved surface which interacts with a curved surface which is arranged on the valve housing. The interacting curved surfaces provide a type of link guide system such that the rotational element is displaced axially when rotated. The valve rod which is mounted on the closure member is provided with a flange. A closing spring acts between the valve housing and the closure member. With the closure member in the open position, said closing spring pulls the flange mounted on the valve rod against a stop face of the rotational element. Latching-in elements act between the flange and the rotational element such that the rotational element is able to be latched in different rotational positions. With the closure member in the closed position, the flange is able to be raised from the stop face. The realization of the manual actuating means of said vacuum valve is connected to increased production expenditure, in particular due to the realizations of the interacting curved surfaces and of further interacting parts of said manual actuating means.

SUMMARY

It is the object of the invention to provide a vacuum valve of the type mentioned in the introduction which can be constructed in a reliable and cost-efficient manner. This is achieved by a vacuum valve with one or more features of the invention as described below and in the claims.

In the case of the vacuum valve according to the invention, the closing spring acts between the valve housing and the closure member and impinges upon the closure member in the closing direction even with the closure member in the open position. In addition, the first driving part is displaceable in relation to the valve housing parallel to the closing direction, wherein, with the closure member in the open position, the closure member is held against displacement in the closing direction brought about by force of the closing spring by means of a supporting stop against which a stop face of the rotational element or of the first driving part abuts. With the closure member in the closed position, the supporting stop is raised (=distanced) from the stop face of the rotational element or of the first driving part, i.e. the first driving part is displaced in a direction opposite the closing direction in relation to a position assumed with the closure member in the open position. Consequently, a sufficient closing force by way of which the closure member in the closed position is pressed against the valve seat such that the vacuum valve is sealed, is able to be applied just by the closing spring. The first driving part, in this connection, can be force-free. The closing force applied by the closing spring is introduced directly into the valve housing by the closing spring.

A very simple realization of the vacuum valve with a small number of separate parts can be achieved in this manner. In the case of a vacuum valve according to the invention, the costs can be kept very low, in the case of such a series product even small cost savings being enormously significant.

At the same time, a vacuum valve according to the invention can be realized in a particularly reliable manner. In particular, an excessive stress load being exerted on an elastic sealing ring, which seals the vacuum valve with the closure member in the closed position, as a result of tightening the rotational element too tightly is able to be avoided. The necessary sealing force can be applied just by the closing spring and a very well defined sealing force can be achieved as a result.

In order to indicate the totally closed state of the vacuum valve also in a haptic manner to the user such that inadvertently rotating the two driving parts completely apart from one another into a separate state is avoided, in an advantageous manner there is present a limiting stop which limits the rotation of the rotational element in the closing direction of rotation. In order to avoid, in this connection, too great an additional force acting in the closing direction being exerted onto the closure member, as a result of which in particular an elastic sealing ring which seals the vacuum valve in its closed state could be damaged, it is preferably provided that the limiting stop is able to be overrun, in particular in a destruction-free manner, when a limit value of the torque acting on the rotational element in the closing direction is exceeded. The limiting stop therefore acts only up to the limit value of the torque acting on the rotational element. In an advantageous manner, the force at which the limiting stop opens (=is overrun) is smaller than the force exerted onto the closure member in the closed position by the closing spring.

In a possible embodiment of the invention, the limiting stop is formed by at least one projection which is arranged on a spring arm and which interacts with a stop face on the rotational element or on the first driving part.

In another possible embodiment, to realize the limiting stop a projection which is arranged on one of the two driving parts can move into abutment against a stop face of the other of the two driving parts.

A vacuum valve according to the invention can be realized as an angle valve. Other realizations where the closure member is displaced in a linear manner between the open position and the closed position are also conceivable and possible.

BRIEF DESCRIPTION OF THE DRAWINGS

Further advantages and details of the invention are explained below by way of the accompanying drawing, in which:

FIG. 1 shows a perspective view of an exemplary embodiment of a vacuum valve according to the invention;

FIGS. 2 and 3 show a side view and a top view;

FIG. 4 shows a section along the line A-A of FIG. 2 with the closure member in the open position;

FIG. 8 shows a section along the line B-B of FIG. 3 with the closure member in the closed position;

FIG. 9 shows a section along the line B-B of FIG. 3 with the closure member in the closed position, the limiting stop having been overrun by the rotational element;

FIG. 10 shows a perspective view of the sealing unit which is arranged in the region of the valve seat;

FIGS. 11 and 12 show exploded representations of the vacuum valve in different viewing directions;

FIG. 13 shows a schematic representation of a further embodiment of the invention.

DETAILED DESCRIPTION OF THE PREFERRED EMBODIMENTS

Figure 5:
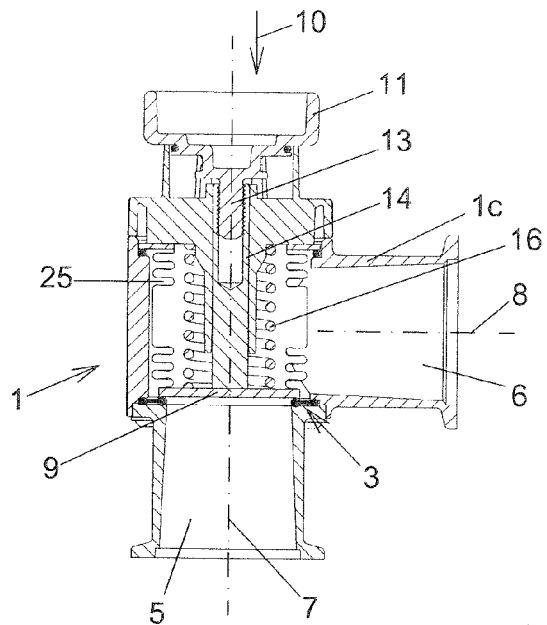
FIG. 5 shows a section along the line A-A of FIG. 2, but in the position in which the closure member abuts against the valve seat when the vacuum valve is closed.

One exemplary embodiment of the invention is shown in FIGS. 1 to 12.

The vacuum valve comprises a valve housing 1. In the exemplary embodiment, said valve housing includes a housing cover 1b which is screw-connected to a basic body 1a of the valve housing. The basic body 1a is provided with a valve connector 1c. A further valve connector 1d of the valve housing 1 is connected to the valve housing 1 by means of the heads 2a of the screws 2 and/or flat washers arranged under said screw heads. The valve connector 1d, in this connection, is sealed in relation to the basic body 1a by means of an elastic seal 3b. The seal 3b is arranged on a carrier 3a, on which is also arranged the elastic seal 3c which rests on a sealing face arranged on the valve connector 1d. The seal 3c forms the dynamic seal of the vacuum valve for sealing the vacuum valve in the closed state.

The valve connector 1d could also be realized integrally with the basic body 1a or could be welded onto the same thereby removing the need for the seal 3b. The valve connector 1c could also be formed by a separate part and could be connected to the basic body 1a for example by means of a screw connection, a further seal being arranged between said two parts.

The valve connectors 1c, 1d are provided with flanges for connection to a further vacuum component, for example a vacuum chamber or a line.

The valve connectors 1c and 1d form first and second valve openings 5, 6 of the vacuum valve. The valve connectors 1c, 1d could also be omitted and the valve openings 5, 6 could be arranged directly in the basic body 1a or in flanges which are arranged directly on the basic body.

The exemplary embodiment shown of the vacuum valve is in the form of an angle valve. The axes 7, 8 of the first and second valve opening 5, 6 are consequently at an angle to one another, in particular a right angle.

A closure member 9 which is realized, in particular, in a plate-shaped manner is arranged in the valve housing 1. In the closed (=sealed) state of the vacuum valve, the closure member 9 assumes its closed position and is pressed against the valve seat 4. In the exemplary embodiment, the valve seat 4 is formed by the preferably flat sealing face which is arranged on the valve connector 1d and by the seal 3c resting thereon. The sealing face on which the seal 3c rests could also be arranged on another part of the valve housing, in particular, on the basic body 1a. In other possible embodiments an elastic seal could also be arranged on the closure member 9 and the valve seat could be formed only by a sealing face of the valve housing 1.

Proceeding from the completely open state of the vacuum valve in which the closure member 9 is situated in its open position and is raised from the valve seat 4 (cf. FIG. 4), the closure member 9 is displaced in a linear manner (in a straight line) in the closing direction 10 to close the vacuum valve. Proceeding from the closed state of the vacuum valve in which the closure member 9 is pressed against the valve seat 4 (cf. FIG. 6), the closure member is displaced in a linear manner in a direction opposite the closing direction 10.

In the exemplary embodiment, the closing direction is parallel to the axis 7 of the first valve opening 5. In other exemplary embodiments, the closing direction 10 could also be at an angle to the axis 7. The valve seat 4 would then have to be arranged in a correspondingly angular manner on the valve housing 1.

A manual actuating means serves for adjusting the closure member 9 in a linear manner between the open and closed position. This manual actuating means includes a manually actuatable rotational element 11. This can also be designated as a rotatory knob or a hand wheel. The rotational element 11 is rotatable about a rotational axis 12 which is parallel to the closing direction 10, in particular coincides with the closing direction 10.

A screw transmission is actuated as a result of rotating the rotational element 11. This screw transmission includes a first driving part 13 which is connected in a non-rotatable manner, e.g. rigidly, to the rotational element 11 and a second driving part 14 which is connected so as to be non-displaceable in the axial direction of the rotational axis 12, e.g. rigidly, to the closure member 9. One of the driving parts 13, 14, in the exemplary embodiment the first driving part 13, is provided with an external thread and the other of the two driving parts, in the exemplary embodiment the second driving part 14, is provided with an internal thread. The two driving parts 13, 14 are in threaded engagement by means of said external and internal thread. The driving part provided with the external thread could also be designated as a threaded spindle and the driving part provided with the internal thread as a spindle nut.

Embodiments where the first driving part connected to the rotational element 11 is provided with an internal thread and the second driving part connected to the closure member 9 is provided with an external thread are also conceivable and possible.

In the exemplary embodiment, the second driving part 14 is realized in the form of a valve rod which is parallel to the rotational axis 12 and on which the closure member 9 is held. On the end remote from the closure member 9, the valve rod is provided with a blind bore which comprises the internal thread. For example, the valve rod could also be realized in a continuously hollow manner.

The second driving part 14 is displaceably guided in the region of the housing cover 1b by the valve housing 1b. The housing cover 1b, in this connection, can advantageously comprise, as shown, a portion in the form of a guide sleeve 15.

A closing spring 16 acts between the housing cover 1b and the closure member 9. This closing spring is supported at the one end on the housing cover 1b and at the other end on the closure member 9. Instead of being supported on the closure member 9, it could also be supported on a projection of the second driving part 14.

The rotational element 11 and the first driving part 13 which is connected thereto are displaceable in a limited manner relative to the valve housing 1 in the closing direction 10 and in a direction opposite the closing direction 10. The displaceability in the closing direction 10 is limited by a supporting stop 17. The displaceability in a direction opposite the closing direction 10 is limited by a limiting stop 18, at least up to a limit value of the force acting on the limiting stop 18.

The limiting stop 18 is arranged on at least one part which is mounted on the valve housing 1, in the exemplary embodiment shown in FIGS. 1 to 12 on spring arms 22 which are mounted on the valve housing 1, as explained in more detail below.

The supporting stop 17 is non-displaceable in the closing direction 10 in relation to the valve housing, preferably also in a direction opposite the closing direction 10. The supporting stop 17 is formed in particular by part of the valve housing 1, for example, as shown, by an annular element which protrudes from the housing cover 1b. The supporting stop 17 could also be formed by a part which is connected rigidly or rotatably to the valve housing 1.

In the open position of the closure member 9 when the vacuum valve is completely open, also with the closure member 9 in intermediate positions between the open position and the closed position as long as the closure member 9 is at a spacing from the valve seat 4, the rotational element 11 abuts against the supporting stop 17 by way of a stop face 19 such that the rotational element 11 and consequently the first driving part 13 and by means of the threaded engagement between the driving parts 13, 14 also the second driving part 14 and the closure member 9 which is connected to the second driving part 14 are supported against a displacement which is effected in the closing direction 10 by the force of the closing spring 16. The stop face 19 could also be arranged on a projection of the first driving part 13.

Figure 7:
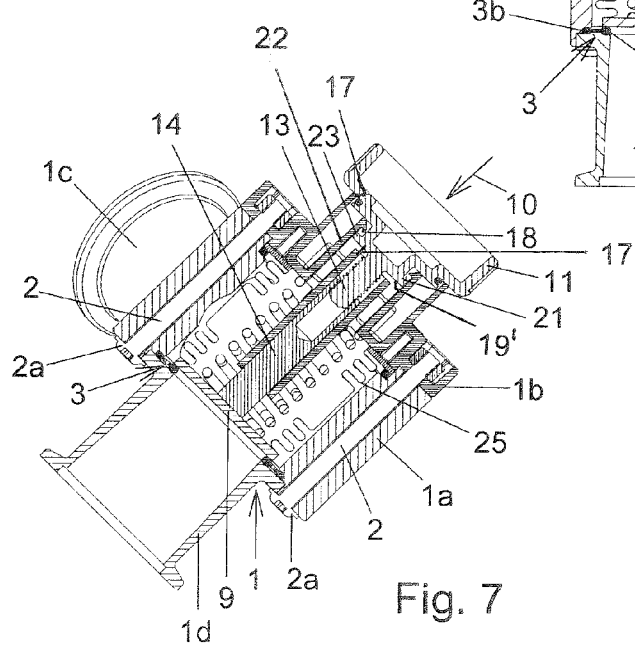
FIG. 7 shows a section along the line B-B of FIG. 3, the closure element in the same position as in FIG. 5.

Proceeding from the open position of the closure member 9, the rotational element 11 is rotated in the closing direction of rotation 20 to close the vacuum valve. As a result, the closure member 9 approaches the valve seat 4 until it abuts against the same, the seal 3c initially (at the first contact by the closure member 9) not yet being compressed. This state is shown in FIGS. 5 and 7. The stop face 21 of the closure element 9 which interacts with the limiting stop 18 is still at a distance from the limiting stop 18 in said position of the closure member 9. When the rotational element 11 is rotated further in the closing direction of rotation 20, the seal 3c is compressed by the closing spring 16, the stop face 19 being raised from the supporting stop 17 as a result of the first driving part 13 and with it the rotational element 11 being displaced in a direction opposite the closing direction 10 in relation to the valve housing 1. As soon as the stop face 19 is raised from the supporting stop 17, the closed position of the closure member 9 is achieved. This is already the case when the stop face 21 is at a distance from the limiting stop 18. The sealing force which presses the closure member 9 against the valve seat 4 is consequently applied only by the closing spring 16 in this state.

When the closure member 9 is rotated further in the closing direction of rotation 20, the first driving part 13 and with it the closure member 9 is displaced in a direction opposite the closing direction 10 in relation to the valve housing 1 and the stop face 21 approaches closer to the limiting stop 18 until the stop face 21 abuts against the limiting stop 18. This signals to the user in a haptic manner that the vacuum valve is completely closed and the closure member 9 is situated in its closed position. This state is shown in FIGS. 6 and 8.

Figure 6:
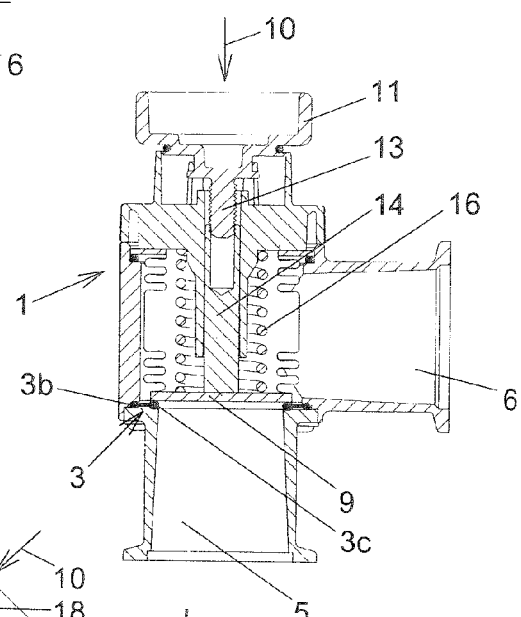
FIG. 6 shows a section along the line A-A of FIG. 2 with the closure member in the closed position.

In order to signal to the user also in a visual manner that the vacuum valve is completely closed and that the closure member 9 is situated in its closed position, there is preferably provided an, in particular colored, marking ring 27 which is arranged on the rotational element 11 and which, when the stop face 21 abuts against the limiting stop 18, is moved out of the annular element which forms the supporting stop 17, cf. FIG. 6.

When the rotational element is subsequently rotated further in the closing direction of rotation 20, the force exerted by the closure member 9 on the seal 3c is increased. When a limit value of the torque acting on the rotational element 11 in the closing direction of rotation 20 is exceeded, the limiting stop 18 yields and the stop face 21 is able to pass the limiting stop 18. FIG. 9 shows the stop face 21 having moved past the limiting stop 18. As a result, the maximum force exerted on the seal 3c by the manual actuation means is limited.

The maximum force absorbable by the limiting stop 18, at which the stop face 21 is held, is preferably less than the force exerted on the closure member 9 by the closing spring 16 with the closure member 9 in the closed position.

The force applied by the closing spring 16 at which the closure member 9 is pressed against the valve seat 4 (=sealing force), is preferably within the range of between 0.5 and 10 N/mm sealing length, a value of between 1 and 4 N/mm sealing length being particularly preferred.

The limiting stop 18 is formed in the exemplary embodiment by several projections which are arranged on respective spring arms 22. The spring arms 22 are spaced apart from one another around the rotational axis in the circumferential direction and interact with an annular collar 23 of the rotational element 11 which comprises the stop face 21. When the annular collar 23 is pressed at increasing force against the projections on the spring arms 22, the spring arms 22 deform until the projections of the spring arms 22 finally slide off the annular collar 23.

In the exemplary embodiment in which the valve housing 1 comprises a basic body 1a and a housing cover 1b, the connecting parts between the rotational element 11 and the closure member 9 extending through an opening in the housing cover 1b, the spring arms 22 are mounted on the outside of the housing cover 1b and protrude from the housing cover 1b in the direction of the rotational element 11.

Other realizations of the limiting stop are conceivable and possible.

The interacting threads of the driving parts 13, 14 are preferably realized as left-handed threads. The closing direction of rotation 20 is aligned in an intuitive manner clockwise as a result.

To open the vacuum valve, the rotational element 11 is rotated in the opening direction of rotation 24 which is opposite the closing direction of rotation 20. The ability to rotate in the opening direction of rotation 24 can be limited, for example, by a stop of the end of the second driving part 14 remote from the closure member 9 on the first driving part 13, thereby achieving the open position of the closure member 9.

A vacuum region which is sealed in relation to the outside space is realized in the interior of the valve housing 1. In the exemplary embodiment shown, a bellows 25 is provided for sealing the vacuum region. This bellows is connected at the one end in a vacuum-tight manner, for example as a result of a weld, to the closure member 9, and at the other end is connected in a vacuum-tight manner to the valve housing 1. For example, a flange disk, which is sealed in relation to the basic body 1a of the valve housing 1 by means of a sealing ring 26, can be welded on the bellows 25 for this purpose. Consequently, no seal is necessary between the housing cover 1b and the basic body 1a.

The bellows 25 which is realized as an undulating bellows in the exemplary embodiment is only shown schematically in the Figures (the undulations are not shown in the central region). The bellows 25 could also be realized as concertina bellows or diaphragm bellows.

In the exemplary embodiment, the closure element 9 and consequently the second driving part 14 is secured against twisting about the rotational axis 12 as a result of the bellows 25. The closure member 9, in this connection, is connected non-rotatably to the second driving part 14.

The sealing of the vacuum region of the valve housing 1 in relation to the feed-through through the valve housing 1 implemented by the manual actuating means could also be effected in another manner. For example, a sealing ring could be arranged between the guide sleeve 15 and the rod-shaped second driving part 14. It would then be necessary to provide a separate anti-twist device for the second driving part 14, for example as a result of a nose which protrudes outward in the region of the end of the second driving part 14 remote from the closure member 9 and runs in an axial groove in the housing cover 1b or the guide sleeve 15.

In a modified embodiment of the invention, in place of the supporting stop 17 shown in the Figures, such a supporting stop could be formed, for example, by the end face 17' of the guide sleeve 15 facing the rotational element 11, the guide sleeve 15 protruding beyond adjacent regions of the housing cover 1b in the region of said end, cf. in particular FIG. 4. The stop face which interacts with said supporting stop formed by the end face 17' could then be formed by the face 19', facing the housing cover 1b, of the portion of the rotational element 11 on which the annular collar 23 is arranged (cf. FIGS. 4 and 7). The faces 17' and 19' would then abut against one another when the vacuum valve is open and there would then be a space between the faces 17 and 19 when the vacuum valve is open or the annular element which comprises the face 19 on the housing cover 1b could also be omitted.

As a result of realizing the vacuum valve according to the invention, in a simple manner it is possible to provide a modular system with which both vacuum valves with manual actuation and with automated (machine-driven) actuation, in particular pneumatic or electric actuation, can be realized. For example, to realize pneumatic actuation in the case of the valve shown in FIGS. 1 to 12, it is possible to omit the rotational element 11 with the first driving part 13 mounted thereon along with the housing cover 1b. In place of the housing cover 1b shown, a cylinder of a pneumatic piston cylinder unit can be connected to the basic body 1a. The piston which is arranged in the cylinder can then comprise a piston rod with an external thread which is screwed into the internal thread of the second driving part 14. When the closure element 9 is actuated by the pneumatic piston cylinder unit, in this case the threaded connection is not twisted.

A modified exemplary embodiment of the invention is shown schematically in FIG. 13. Only the manual actuating means and a portion of the valve housing 1 are shown here. The realization corresponds to the exemplary embodiment described previously with the exception of the differences described below.

The first driving part 13' which is connected to the rotational element 11 once again comprises an external thread and is screwed by way of the same into the second driving part 14' which is provided with an internal thread. The second driving part 14' which is connected to the closure member 9 is realized here in a cup-shaped manner.

The limiting stop 18' is realized here by a ring-shaped projection on the end of the first driving part 13' remote from the rotational element 11. In order to limit the rotation of the rotational element 11 in the closing direction of rotation 20 with the closure member 9 in the closed position, the limiting stop 18' strikes against the stop face 21' on the second driving part 14'. Further rotation of the rotational element 11 in the closing direction of rotation 20 is blocked as a result. In this exemplary embodiment, when the stop face 21' abuts against the second driving part 14', a torque exerted on the rotational element 11 in the closing direction of rotation 20 does not result in additional pressing of the seal 26 which seals the closure member 9 in relation to the valve housing 1. Constructing the limiting stop 18' so that it can be overrun is consequently not necessary in this exemplary embodiment.

In the exemplary embodiment shown in FIG. 13, the seal 26 is arranged on the closure member 9. Instead of this, however, once again the valve seat can comprise the seal, for example corresponding to the seal 3c of the sealing unit 3.

Different modifications of the exemplary embodiments shown are conceivable and possible without departing from the scope of the invention. For example, the valve openings 5, 6 could also be arranged on opposite sides of the valve housing 1 such that the axes 7, 8 of the valve openings 5, 6 are parallel to one another. The valve seat 4 could then be arranged obliquely with respect to the axes 7, 8 in the valve housing and the rotational axis 12 could be located correspondingly obliquely with respect to the axes 7, 8.

In the case of a vacuum valve according to the invention, the closure member and the valve seat could also comprise a form that differs from that shown. Thus, the closure member could be realized, for example, in a wedge-shaped manner and could interact with a correspondingly realized valve seat. The seal which is arranged on the closure member or on the valve seat and the sealing face which interacts therewith and is arranged on the other of the two parts could also comprise a form that differs from the three-dimensional one known.

| Key to the Reference Numerals: | |
|---|---|
| 1 | Valve housing |
| 1a | Basic body |
| 1b | Housing cover |
| 1c | Valve connector |
| 1d | Valve connector |
| 2 | Screw |
| 2a | Head |
| 3 | Sealing unit |
| 3a | Carrier |
| 3b | Seal |
| 3c | Seal |
| 4 | Valve seat |
| 5 | First valve opening |
| 6 | Second valve opening |
| 7 | Axis |
| 8 | Axis |
| 9 | Closure member |
| 10 | Closing direction |
| 11 | Rotational element |
| 12 | Rotational axis |
| 13, 13' | First driving part |
| 14, 14' | Second driving part |
| 15 | Guide sleeve |
| 16 | Closing spring |
| 17 | Supporting stop |
| 18, 18' | Limiting stop |
| 19 | Stop face |
| 20 | Closing direction of rotation |
| 21, 21' | Stop face |
| 22 | Spring arm |
| 23 | Annular collar |
| 24 | Opening direction of rotation |
| 25 | Bellows |
| 26 | Seal |
| 27 | Marking ring |

The invention claimed is:

1. A vacuum valve comprising: a valve housing which includes a valve seat, a closure member which, in a closed position, is pressed against the valve seat with the vacuum valve in a closed state, and in an open position is raised from the valve seat with the vacuum valve in an open state, and a manual actuator by which the closure member is displaceable in a linear manner in a closing direction from the open position into the closed position and in a direction opposite the closing direction from the closed position into the open position, the manual actuator comprises a screw transmission, and a rotational element for actuating the screw transmission, the screw transmission comprising a first driving part which is connected to the rotational element and a second driving part which is connected to the closure member, the first and second driving parts, one of the first and second driving parts comprises an external thread and an other of the first and second driving parts comprising an internal thread, wherein the first and second driving parts are in threaded engagement and as a result of rotating the rotational element in a closing direction of rotation the closure member, which is situated in the open position, is displaceable in the closing direction and as a result of rotating the rotational element in an opening direction of rotation, which is opposite to the closing direction of rotation, the closure member, which is situated in the closed position, is displaceable in a direction opposite the closing direction, the vacuum valve further comprising a closing spring, which acts upon the closure member in the closing direction with the closure member in the closed position, the closing spring acts between the valve housing and the closure member and impinges upon the closure member in the closing direction even with the closure member in the open position, and the first driving part is displaceable relative to the valve housing parallel to the closing direction, wherein, with the closure member in the open position, the closure member is held against displacement in the closing direction by a supporting stop against which a stop face of the rotational element or of the first driving part abuts, wherein with the closure member in the closed position, rotation of the rotational element in the closing direction of rotation is limited by a limiting stop, wherein when the rotation of the rotational element effected in the closing direction of rotation is limited by the limiting stop, the rotational element or the first driving part abuts against the limiting stop, and wherein the limiting stop is formed by at least one projection which is arranged on a spring arm, so that the limiting stop can be overrun in a non-destructive manner by the rotational part or the first driving part abutting against it when a limit value of torque acting on the rotational element in the closing direction is exceeded.

2. The vacuum valve according to claim 1, wherein at least one spring arm is mounted on the valve housing.

3. The vacuum valve according to claim 1, wherein a force opposing the overrunning by the limiting stop is less than a force exerted onto the closure member by the closing spring with the closure member in the closed position.

4. The vacuum valve according to claim 1, wherein when the rotation of the rotational element effected in the closing direction of rotation is limited by the limiting stop, a projection of the first or second driving part which comprises the external thread abuts against the other of said two driving parts.

5. The vacuum valve according to claim 1, wherein the threads of the first and second driving parts which engage with one another are left-handed threads.

6. The vacuum valve according to claim 1, wherein the second driving part is guided so as to be displaceable by the valve housing.

7. The vacuum valve according to claim 1, wherein the first driving part which is connected to the rotational element comprises the external thread.

8. The vacuum valve according to claim 7, wherein the second driving part is formed by a valve rod which is connected to the closure member and comprises the internal thread.

* * * * *